United States Patent [19]

Hagenberg et al.

[11] Patent Number: 5,392,816
[45] Date of Patent: Feb. 28, 1995

[54] ASSEMBLY OF MOUTHPIECE, STOPPER AND LOCK FOR SHUTTING OFF A PIPE MOUTH

[75] Inventors: Hendrikus Hagenberg; Ferdinand Hagenberg, both of Ridderkerk, Netherlands

[73] Assignee: Hagenberg Projekten B.V., Ridderkerk, Netherlands

[21] Appl. No.: 137,105

[22] PCT Filed: Apr. 16, 1992

[86] PCT No.: PCT/NL92/00076

§ 371 Date: Nov. 10, 1993

§ 102(e) Date: Nov. 10, 1993

[87] PCT Pub. No.: WO92/18395

PCT Pub. Date: Oct. 29, 1992

[30] Foreign Application Priority Data

Apr. 19, 1991 [NL] Netherlands ................... 9100685

[51] Int. Cl.6 ............................................. F16L 55/10
[52] U.S. Cl. ........................... 138/89; 138/96 T; 70/171; 220/210; 220/DIG. 20
[58] Field of Search ............... 138/89, 96 R, 96 T, 138/178; 220/203, 206, 210, DIG. 33, DIG. 19, DIG. 20; 70/171, 158

[56] References Cited

U.S. PATENT DOCUMENTS 1,581,762 4/1926 Murchison ..................... 70/171
1,885,547 11/1932 Rider .
2,525,162 10/1950 Wise ............................ 138/89
2,820,565 1/1958 Oberle ......................... 70/171
3,130,571 4/1964 Neumann ..................... 138/89
4,343,161 8/1982 Gale ............................ 138/89
4,579,244 4/1986 Fukuta .
4,984,698 1/1991 Stuckey ...................... 70/171

FOREIGN PATENT DOCUMENTS 1190429 10/1959 France ........................ 70/171
1194598 11/1959 France .
2945540 6/1981 Germany .
446918 3/1949 Italy ........................... 70/171
2071627 9/1981 United Kingdom .

Primary Examiner—James E. Bryant, III
Attorney, Agent, or Firm—Bell, Seltzer, Park & Gibson

[57] ABSTRACT

An assembly for closing a pipe mouth comprising a mouthpiece connected to a pipe mouth, and a stopper having an axially projecting portion which is adapted for insertion into the mouthpiece. The stopper includes a lock which is operable by a key, and such that in the released position, the stopper can be moved into and out of the mouthpiece with the key securely connected to the lock, and in the locked position the stopper is retained in the mouthpiece and the key may be removed. The lock includes a magnetic control means which permits the lock to be moveable between the released and locked positions only when the stopper is inserted in the mouthpiece.

6 Claims, 5 Drawing Sheets

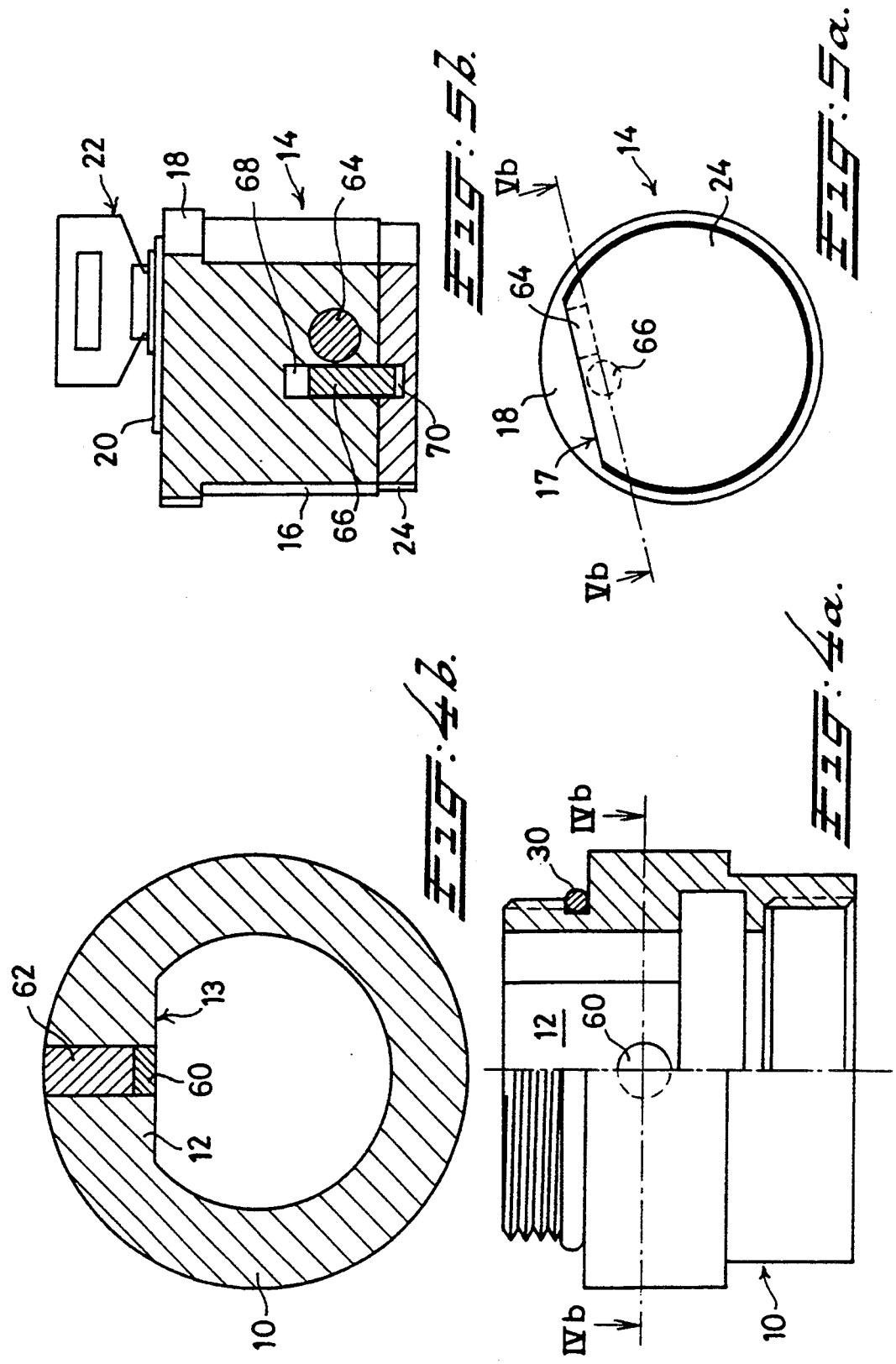

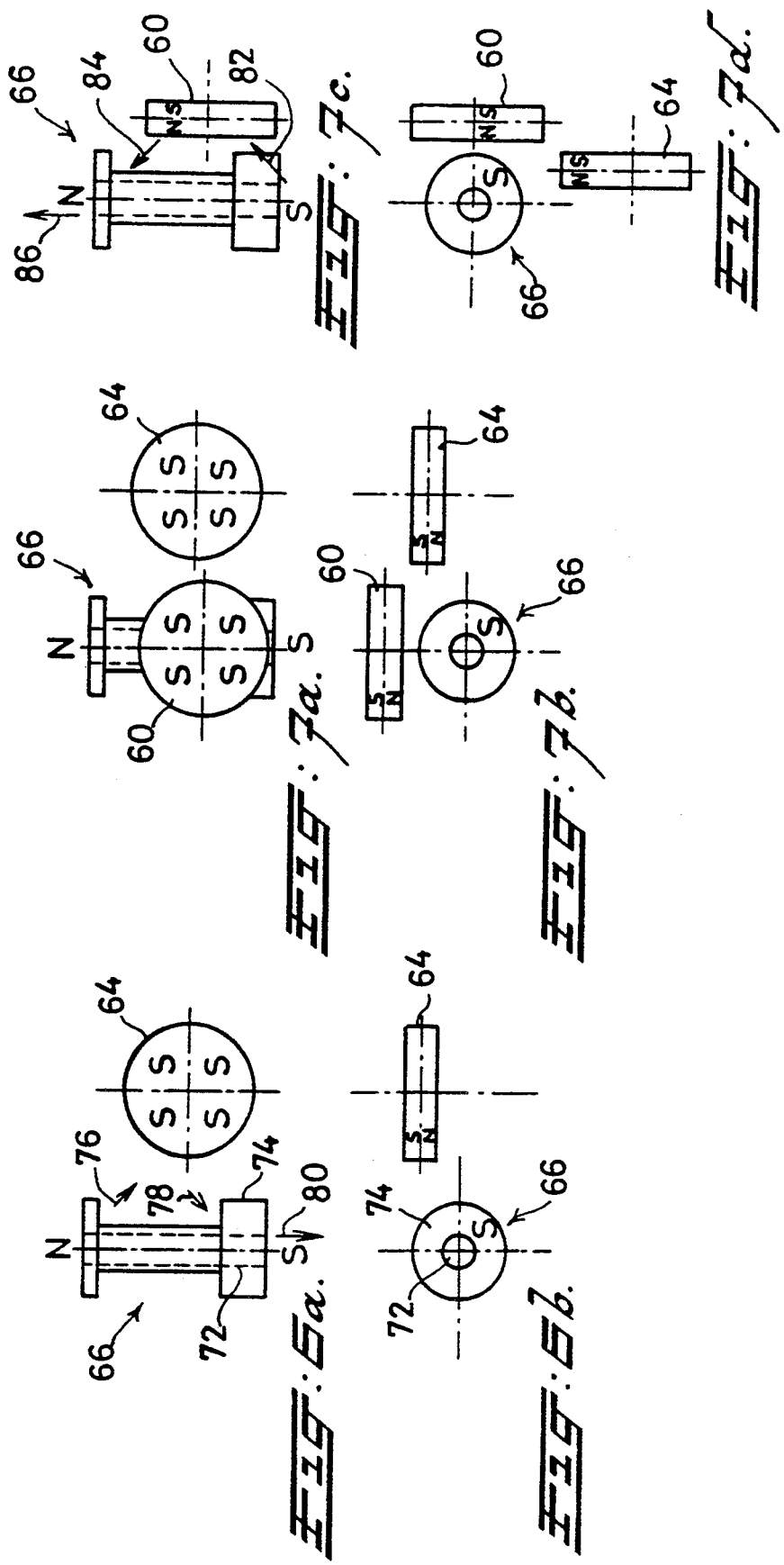

ASSEMBLY OF MOUTHPIECE, STOPPER AND LOCK FOR SHUTTING OFF A PIPE MOUTH

BACKGROUND OF THE INVENTION

The invention relates to an assembly for shutting off a pipe mouth, comprising an essentially tubular mouthpiece which is open at both ends, for connection to the pipe mouth; a stopper for shutting off one end of the mouthpiece, which stopper has an axially projecting part which is intended for insertion into the mouthpiece; and a lock which is placed by a key in a locked and a released position, in the locked position the stopper on the mouthpiece being securely connected to the mouthpiece and the key being freely movable into and out of the lock, and in the released position the stopper being freely movable relative to the mouthpiece and the key being securely connected to the lock, the lock being integral with the stopper of which the projecting part comprises: a first locking element whose movement is coupled to that of the key and in the locked position of the lock, when the stopper is on the corresponding mouthpiece, is in engagement with the mouthpiece for mechanical locking of the stopper on the mouthpiece; and a second locking element which in the released position of the lock blocks the first locking element when the stopper is off the mouthpiece, and releases the first locking element when the stopper is on the corresponding mouthpiece, the mouthpiece and the stopper being provided with interacting control means for the operation of the second locking element.

Such an assembly of mouthpiece, stopper or cap and lock is known from French patent specification No. 1194598, and is e.g. used to prevent unauthorised or undesirable access to tanks of liquids such as fuel, foods etc. This securing can be desired for different reasons.

A first reason can be the risk of theft of a part of the liquid. In particular, if the pipe mouth is in the open air on freely accessible ground, and continuous guarding or constant supervision is impossible or impractical, theft can occur, with a greater likelihood as the unit price-of the liquid increases. One example is the theft of motor fuel from a vehicle.

Secondly, the chance of an act of sabotage or vandalism can lead to security measures designed to prevent the undesirable addition of substances which make the liquid unusable, such as the addition to liquid fuels of substances which impede the pumping of the fuel or prevent its combustion, or which in the process are converted into undesirable residues of solid material. If the tank contains a liquid for human or animal consumption, it must be possible to prevent the addition of undesirable or dangerous substances such as a dye or a poison to it.

Thirdly, limits can be set for access to a tank, from the point of view of safety, e.g. in order to prevent mistakes.

The access security measures taken for the above-mentioned reasons generally involve the manufacture of the mouthpiece and the stopper from a strong material which has great resistance to mechanical and chemical Influences, and the use of a lock which can be opened only with a special key.

In the-prior art, if the stopper is not on the mouthpiece, the first locking element, and the lock coupled to it, is blocked by the second locking element, so it is impossible to remove the key from the lock. This locking is not removed until the stopper is in the mouthpiece, in which case the control means can act on the second locking element and thus remove the blocking of the first locking element. A key therefore principally cannot be used for the lock of more than one stopper at a time. This is advantageous if the key and the cylinder belonging to it are protected, so that a loose key principally ensures that the corresponding stopper is securely connected to the corresponding mouthpiece. In this way interchanging stopper is also impossible. Depending on the lock system chosen, working with authorised users means that a secure system of access to liquid tanks can be achieved.

However, the blocking of the first locking element by the second locking element in the prior art is mechanical and can be released quite simply with a simple tool when the stopper is not on the mouthpiece. Thereby the key can be released and the risk of fraud is relatively high, since the key can be moved into the position for locking without the stopper being on the mouthpiece, with the result that key and lock can be separated from each other without the pipe mouth actually having been secured. This makes it difficult to check that the security regulations on it have been carried out correctly.

Furthermore, in particular in the situation outlined above, it is possible to interchange stoppers of corresponding shape coming from different mouthpieces, even if only one key is available for several stoppers. This again can be undesirable in certain circumstances.

SUMMARY OF THE INVENTION

The object of the invention is to provide an assembly of a mouthpiece, stopper and lock wherein the risk of fraud is greatly reduced, and the invention is characterised in that the control means comprise at least two magnetic elements, at least one of the magnetic elements being a permanently magnetic element, of which magnetic elements the first is securely connected to the mouthpiece, while the second is accommodated in the stopper so that it is movable against a biasing force under the influence of the force generated by the magnetic field of the or each permanently magnetic element, and is coupled to the second locking element for blocking and releasing the first locking element. Here, a magnetic element may bed permanently magnetic element, or an element made of a magnetizable material on which a force can be exerted by means of a permanently magnetic element, or a combination of both. One or more permanently magnetic elements may be accommodated in the mouthpiece or in the stopper, or in both.

A mechanical contactless operation of the second locking element is possible through the use of the magnetic elements. Another great advantage of the use of magnetic elements is that they can be fitted in the inside of the stopper and the mouthpiece so that they cannot be seen from the outside. Besides, a predetermined combination of a stopper and a mouthpiece can be established by varying the number and the positioning of the poles of the or each permanently magnetic element, with the result that it is impossible to fit a stopper in a mouthpiece to which it does not belong.

Although a biasing force for the second magnetic element can be simply and efficiently supplied by a spring, for reasons of long-term reliability and contamination resistance preference is given to an embodiment wherein the biasing force on the magnetic element in the stopper coupled to the second locking element is generated by the interaction with another magnetic element accommodated in the stopper, at least one of said magnetic elements in the stopper being a permanently magnetic element.

The best operation of the control means over the largest distance is obtained when each magnetic element is a permanently magnetic element.

A clear orientation of the stopper in the tangential direction relative to the corresponding mouthpiece is obtained if the projecting part of the stopper is essentially cylindrical and has a flat side extending in the axial direction, while the inside of the mouthpiece is formed with play to be at least partially complementary to the projecting part of the stopper. In this embodiment the control means can be fitted at one point along the periphery of the stopper or the mouthpiece, since on account of the above-mentioned flat side which they both have, they cannot any longer be turned relative to each other. The part of the control means situated in the mouthpiece can be accommodated simply in the inward bulge of the mouthpiece which defines the flat side thereof, and therefore control means which are fitted near the flat sides of the stopper and the mouthpiece are preferable. This is particularly advantageous With the use of the magnetic elements as the control means.

An assembly which is particularly resistant to vandalism and sabotage is obtained by covering the connection point between the pipe mouth and the mouthpiece with a slip pipe which rotates freely in the tangential direction about the pipe mouth. The connection point is thus not accessible, and the removal of such a slip pipe is difficult because it has little grip for tools.

BRIEF DESCRIPTION OF THE DRAWINGS

The invention is explained with reference to the drawing, in which:

FIG. 4a is a partial cross-section of a mouthpiece, illustrating the accommodation of a magnetic element therein;

FIG. 4b shows a cross-section of the mouthpiece of FIG. 4a, taken along the line IV—IV in FIG. 4a;

FIG. 5a shows a bottom view of a stopper, illustrating the accommodation of magnetic elements therein;

FIG. 5b shows a cross-section of the stopper of FIG. 5a, taken along the line V—V in FIG. 5a;

FIG. 6a schematically shows the magnetic elements in the stopper of FIGS. 5a and 5b, illustrating the interacting magnetic forces;

FIG. 6b shows a bottom view of the magnetic elements of FIG. 6a;

FIG. 7a schematically shows the magnetic elements in the stopper of FIGS. 5a and 5b and in the mouthpiece of FIGS. 4a and 4b, when the stopper is placed in the mouthpiece, for illustrating the interacting magnetic forces;

FIG. 7b shows a bottom view of the magnetic elements of FIG. 7a;

FIG. 7c shows a side view of the magnetic elements shown in FIG. 7a; and

FIG. 7d shows a bottom view of the magnetic elements of FIG. 7c.

DETAILED DESCRIPTION OF THE PREFERRED EMBODIMENT

Figure 1:
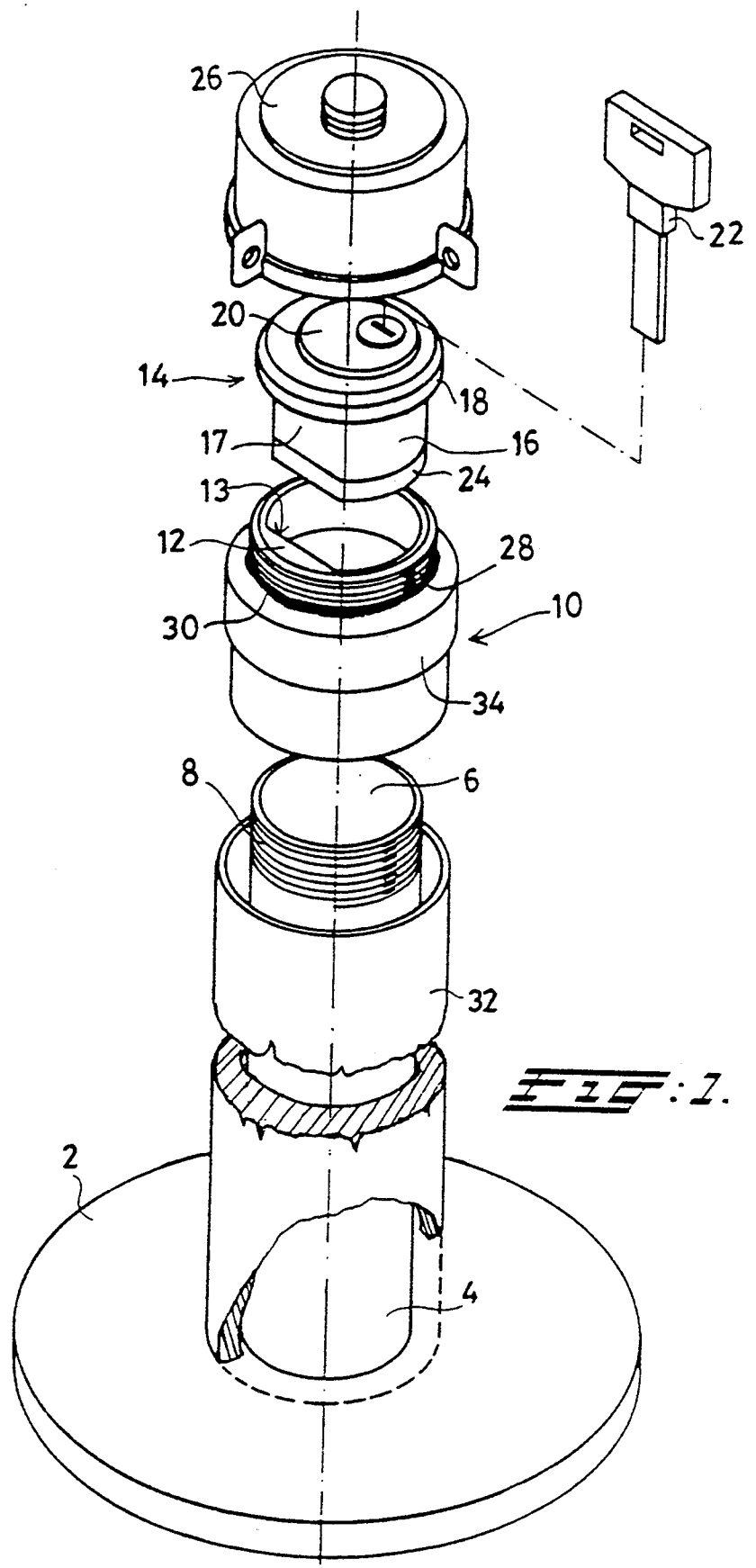
FIG. 1 shows an exploded perspective view of an assembly according to the invention for shutting off of a pipe mouth.

FIG. 1 shows a flange 2 which is intended to be fixed on a corresponding flange which is connected to a tank, the flange 2 being provided with a central aperture, and being integral with a pipe 4 which is provided an the outside with screw thread 8 near the pipe mouth 6 thereof. Pipe diameters of 1½, 3 or 4 inches are commonly used in the chemical/petrochemical industry. An essentially tubular mouthpiece 10 can be fixed on the pipe mouth 6, which fixing in the example of an embodiment shown is achieved by providing the inside of the mouthpiece 10 at the side facing the pipe mouth 6 with grooves of screw corresponding to the screw thread 8, with the result that the mouthpiece 10 can be screwed securely on the pipe 4. A bulge 12 with an axially flat side 13 is provided in the aperture of the mouthpiece 10 facing away from the pipe mouth 6, which bulge partially shuts off the aperture. A suitable piece of equipment for screwing mouthpiece 10 securely on the pipe 4 comprises, for example, a tap of a shape which is complementary to the above-mentioned aperture, which tap is provided with a radially projecting handle for turning the tap. The mouthpiece 10 is thus turned on the pipe 4 until a stop edge 15 (FIG. 2) of the mouthpiece 10 abuts against the end of the pipe 4 provided with screw thread 8. A particularly good coupling between mouthpiece 10 and pipe 4 is obtained by applying a sealing agent, for example a hardening plastic, prior to the coupling to the screw thread 8 or the corresponding screw thread on the inside of the mouthpiece 10.

An essentially cylindrical stopper 14 with a projecting part 16 can be fitted in the above-mentioned aperture of the mouthpiece 10, which part is to that end provided with a flat side 17 shaped so that it is complementary to the bulge 12. The stopper 14 is provided with a collar 18 which forms a stop edge when the stopper is being fitted in the mouthpiece 10. A lock 20 is accommodated in the stopper 14, which lock can be moved by means of a key 22 into a released position in which the key cannot be removed from the lock, and into a locked position in which the key can be removed from the lock. Turning the key 22 inserted in the lock 20 produces a turning of a locking disc 24 fitted at the underside of the projecting part 16 of the stopper and connected to the lock 20, as a result of which an edge part of the locking disc 24 can be moved into and out of a radially recessed part of the mouthpiece 10, and the stopper 14 is thus fixed or not fixed in the mouthpiece 10. The locking disc 24 has a peripheral shape which corresponds to the shape of the cross-section of the projecting part 16 of the stopper 14. It should be pointed out that the situation shown in FIG. 1, in which the stopper 14 is not in the mouthpiece 10 and the key 22 is not in the lock 20, cannot occur in reality, as will be explained below with reference to FIG. 2. In order to protect the stopper 14 and the lock 20 from weather influences and the like when they are fitted in the mouthpiece 10, provision is made for a conventional screw cap 26 which is provided on the inside with a screw thread matching a screw thread 28 provided on the outside of the mouthpiece 10. In order to limit soiling of the latter two screw threads, a sealing ring 30 is placed at one end of the screw thread 28. A slip pipe 32 freely rotatable about the pipe 4 protects the pipe 4 and the connection point of said pipe to the mouthpiece 10. For this purpose, the mouthpiece 10 is also provided with a radial thickening 34 of which the side facing the pipe 4 rests on the edge of the slip pipe 32 facing the mouthpiece 10 when the assembly is fitted.

Figure 2:
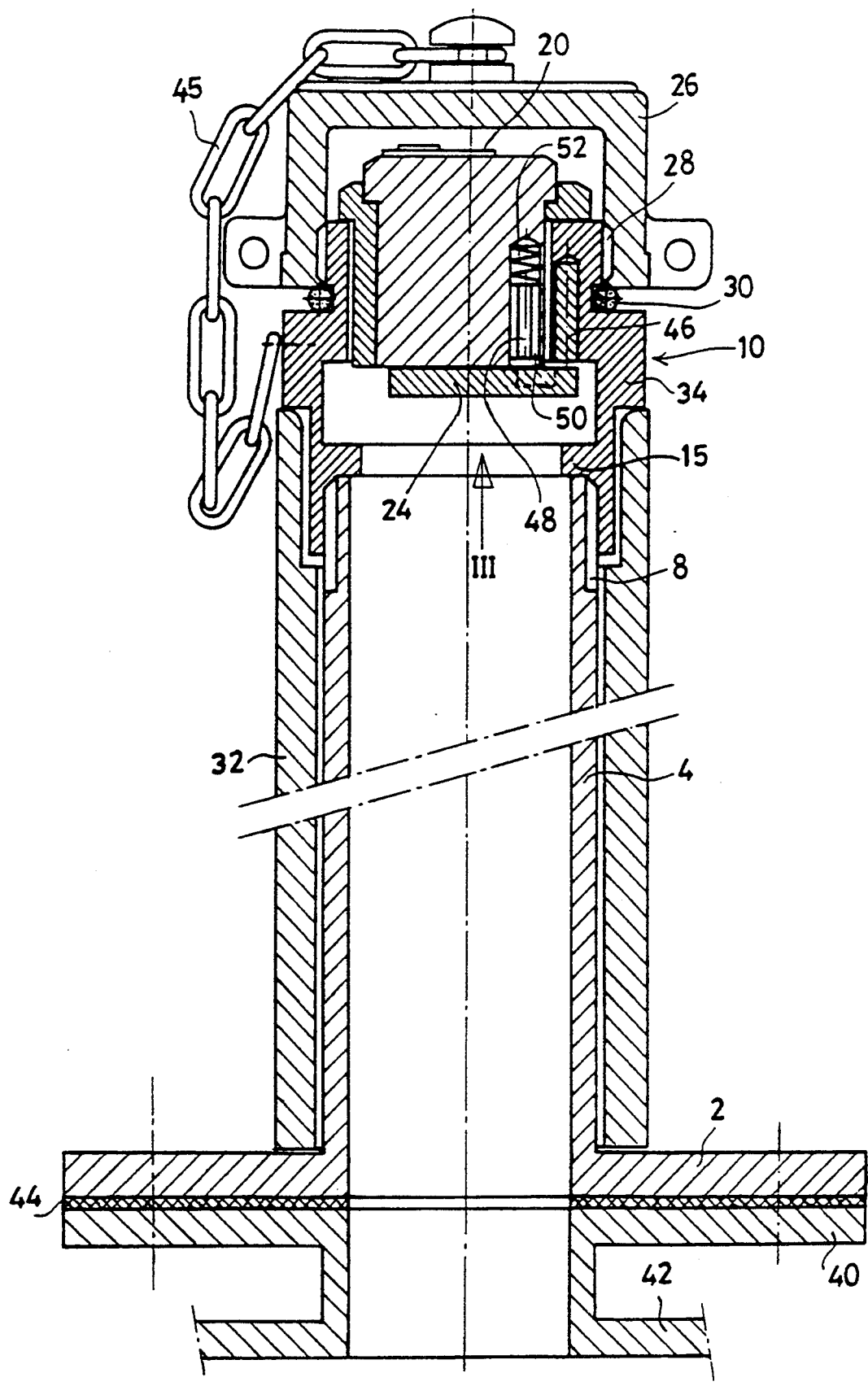
FIG. 2 shows, on an enlarged scale, a partial longitudinal section of the assembly of FIG. 1, in the fitted state on a tank.

FIG. 2 shows the elements shown in FIG. 1 in more detail and fitted on the flange 40 of an only partially shown tank 42. The flange 2 is fixed, for example by means of screws, on the flange 40, with the interposition of a gasket 44. The screw cap 26 can be connected to the mouthpiece 10 by means of a chain 45 in order to prevent it from being lost.

The construction, the operation and the use of the stopper 14 and the mouthpiece 10 belonging to it will be discussed in particular below with reference to FIGS. 2, 3a and 3b. The inward bulge 12 of the mouthpiece 10 contains an elongated cylindrical permanent magnet, in which the number and the position of the poles of the magnet 46 are selected on the basis of considerations to be explained below. The magnet 46 is securely fixed, for example by means of adhesives, in a hole provided for it in the mouthpiece. In the situation shown in FIG. 2, a second permanent magnet 48 is provided opposite the magnet 46 in the stopper 14 at the side of the flat side 17 thereof, which second magnet is accommodated so that it can slide in the axial direction in the stopper 14. The cylindrical magnet 48 is provided with a cover 50 which protects the magnet 48 from damage or breakage when transverse forces are exerted on it. In the situation shown, the second permanent magnet 48 is subjected to two forces in opposite directions. A first axially directed force in the direction of the locking disc 24 is exerted by a slightly compressed compression spring 52. A force directed axially away from the locking disc 24 is produced by the interaction between the permanent magnet 46 and the permanent magnet 48. The position, the number, and the strength of the poles of the magnet 48 are selected in such a way here that in the position shown a balance exists between the above-mentioned two axial forces in opposite directions, with the result that the magnet 48 with the cover 50 is not in contact with the locking disc 24. It will be clear that the desired interaction between the magnets 46 and 48 can come about only if the stopper and the mouthpiece of which they form part are not made of magnetic material, or are made of such material only at specific places to obtain the desired operation. It will also be clear the same operation of the assembly can be obtained if one of the magnets 46 or 48 would be replaced by a similar element made of magnetizable material not being permanently magnetized.

If the stopper 14 is not in the mouthpiece 10, the force of magnetic origin directed away from the locking disc 24 is absent, and the compression spring 52 will move the magnet 48 in the direction of the locking disc 24. The locking disc 24, which assumes a different position from that shown in FIG. 2 when the stopper 14 is removed from the mouthpiece 10, i.e. a position such as that shown in FIG. 1, has a blind hole 54 provided in line with the magnet 48 in the position shown in FIG. 1 (see FIGS. 3a, 3b), with a diameter which is slightly larger than the diameter of the cover 50 of the magnet 48. The magnet 48 will thus be pressed through the action of the compression spring 52 into the blind hole of the locking disc 24 and further block a pivoting movement of the locking disc 24. The compression spring 52 also ensures that the blocking of the locking disc 24 remains effective in all positions of use of the stopper 14 and can be removed only by inserting the stopper 14 into the corresponding mouthpiece 10, in which case the two magnets 46 and 48 are brought close enough to each other to cause a mutual force effect, and the blocking of the locking disc 24 is removed.

Figure 3A:
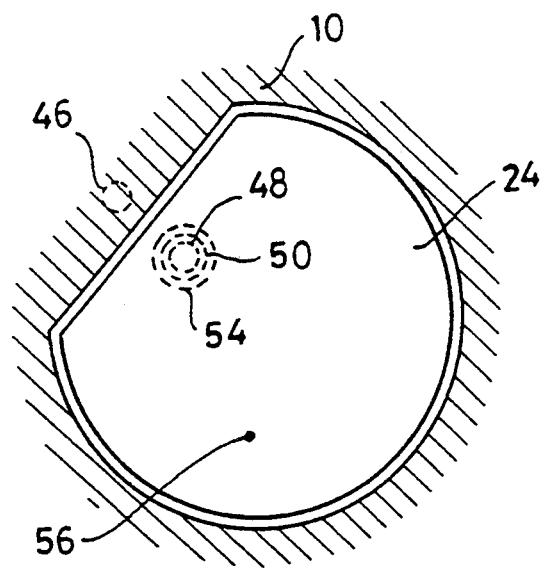
FIGS. 3a and 3b show a view in the direction of arrow III in FIG. 2 of the stopper according to FIGS. 1 and 2, in which the lock in in the released position and the locked position, respectively.
Figure 3B:
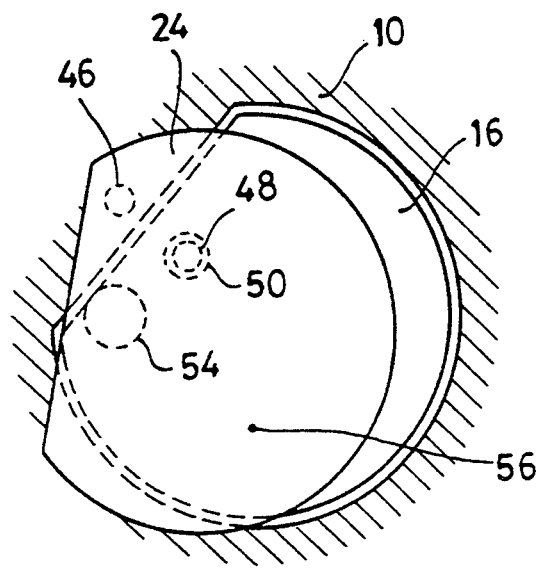

FIGS. 3a and 3b illustrate the locking of the stopper 14 in the mouthpiece 10 in greater detail. In the released position of the lock the permanent magnet 48 with the cover 50 and the blind hole 54 in the locking disc 24 are in line with one another. The locking disc 24 is in line with the projecting part 16 of the stopper 14, and the latter can be moved freely into and out of the mouthpiece 10. As soon as the stopper 14 is moved out of the corresponding mouthpiece 10, the magnet 48 with the cover 50 prevents the locking disc 24 from pivoting about pivot point 56. This also means that the key 22 cannot be turned in the lock 20, and a removal of the key from the lock, which is possible only in the locked position of the lock, is also impossible. The blocking of the locking disc 24 is removed when the stopper 14 is inserted in the corresponding mouthpiece 10, following which the lock 20 can be turned by means of the key 22 into its locked position, in which the locking disc 24 also rotates about the pivot point 56 thereof relative to the projecting part 16 of the stopper 14, and a secure fixing of the stopper on the mouthpiece is obtained.

In order to make it impossible for the blocking of the locking disc 24 to be removed with the aid of any permanent magnet when the stopper 14 is removed, the magnets 46 and 48 can be provided with a specific combination of north and south poles. Also several interacting permanent magnets can be fitted along the periphery of the stopper 14 and the mouthpiece 10, possibly provided with different pole configurations, which makes fraud even more difficult.

In the embodiment of FIGS. 4a and 4b a disc-shaped permanently magnetic element 60 is fitted in the inward bulge 12 of the mouthpiece 10, in such a way that one flat side of the magnetic element 60 is in line with the flat side 13 of the bulge 12. A hole drilled in the mouthpiece 10 in the radial direction for fitting the magnetic element 60 is closed by a plug 62, preferably of the same material as the mouthpiece 10.

In the embodiment of a stopper 14 of FIGS. 5a and 5b adapted to interact with the mouthpiece of FIGS. 4a and 4b, a disc-shaped permanently magnetic element 64 is fitted in the projecting part 16 in such a way that one flat side of the magnetic element 64 is in line with the flat side 17 of the projecting part 16. A cylinder-shaped permanently magnetic element 66, preferably provided with a cover as shown in FIG. 2, is fitted slideably in a bore 68 in the projecting part 16 of the stopper 14. In the position of the locking disc 24 shown in FIGS. 5a and 5b, a bore 70 in the locking disc 24 is in line with the bore 68, so that the magnetic element 66 may move into the bore 70 by magnetic forces exerted on it, thereby blocking the locking disc 24. In this position the key 22 cannot be taken out of the lock 20.

The interaction of the permanent magnets 60, 64 and 66 is now explained in more detail with reference to FIGS. 6a, 6b and 7a–7d.

In FIGS. 6a and 6b the interaction of the stopper magnets 64 and 66 is illustrated in the situation that the stopper 14 has been removed from the mouthpiece 10. The magnetic element 66, which comprises a cylindrical permanent magnet 72 and a protective metal dumbbell-like cover 74 has a magnetic northpole N at the end facing away from the locking disc 24, and a magnetic southpole at the other end. As specifically shown in FIG. 6b, permanent magnet 64 has a magnetic northpole N at the side facing the interior of the stopper 14, and a magnetic southpole S at the opposing side. In the arrangement shown, the net effect is that the southpole S of the magnet 64 attracts the northpole N of the magnet 72 (force indicated by arrow 76), and the southpole S of the magnet 64 repels the southpole S of the magnet 72 (force indicated by arrow 78), so that a resultant force indicated by arrow so is exerted on the magnetic element 66, driving it into the bore 70 of the locking disc 24 (FIG. 5b).

The spatial arrangement of the magnetic elements 60, 64 and 66 in the situation where the stopper 14 is on the mouthpiece 10, is shown in FIGS. 7a–7d. The magnet 60 has a magnetic northpole N at the side facing the stopper 14, and a magnetic southpole S at the opposing side. In this arrangement, due to the fact that magnet 60 is closer to magnetic element 66 than magnet 64, the net effect is that the northpole N of the magnet 60 at the same time attracts the southpole S of the magnetic element 66 (force indicated by arrow 82) and repels the northpole N of the magnetic element 66 (force indicated by arrow 84), so that due to the asymmetrical arrangement of magnetic elements 60 and 66 a resultant force indicated by arrow 86 is exerted on the magnetic element 66, urging it out of the bore 70 of the locking disc 24, thereby releasing the locking disc.

Particular advantages of the embodiment shown in FIGS. 4a–7d are the low number of moving parts and the simple construction.

In the drawings and specification, there have been set forth preferred embodiments of the invention, and although specific terms are employed, they are used in a generic and descriptive sense only and not for purposes of limitation.

We claim:

1. Assembly for shutting off a pipe mouth, comprising:

an essentially tubular mouthpiece (10) which is open at both ends, for connection to the pipe mouth;

a stopper (14) for shutting off one end of the mouthpiece (10), which stopper has an axially projecting part (16) which is intended for insertion into the mouthpiece; and a lock (20) which is placed by a key (22) in a locked and a released position, in the locked position the stopper (14) on the mouthpiece (10) being securely connected to the mouthpiece (10) and the key (22) being freely movable into and out of the lock (20), and in the released position the stopper (14) being freely movable relative to the mouthpiece (10) and the key (22) being securely connected to the lack (20), the lock (20) being integral with the stopper (14) of which the projecting part (16) comprises:

a first locking element (24) whose movement is coupled to that of the key (22) and in the locked position of the lock (20), when the stopper (14) is on the corresponding mouthpiece (10), is in engagement with the mouthpiece (10) for mechanical locking of the stopper (14) on the mouthpiece (10); and a second locking element (48, 50) which in the released position of the lock (20) blocks the first locking element (24) when the stopper (14) is off the mouthpiece (10), and releases the first locking element (24) when the stopper (14) is on the corresponding mouthpiece (10), the mouthpiece (10) and the stopper (14) being provided with interacting control means (46, 48) for the operation of the second locking element (48, 50), characterised in that the control means comprise at least two magnetic elements, at least one of the magnetic elements being a permanently magnetic element, of which magnetic elements the first (46) is securely connected to the mouthpiece (10), while the second (48) is accommodated in the stopper (14) so that it is movable against a biasing force under the influence of the force generated by the magnetic field of the or each permanently magnetic element, and is coupled to the second locking element (48, 50) for blocking and releasing the first locking element (24).

2. Assembly according to claim 1, characterised in that the biasing force on the magnetic element in the stopper (14) coupled to the second locking element (48, 50) is generated by the interaction with another magnetic element accommodated in the stopper (14), at least one of said magnetic elements in the stopper being a permanently magnetic element.

3. Assembly according to claim 1, characterized that each magnetic element is a permanently magnetic element.

4. Assembly according to claim 1, characterised in that the projecting part (16) of the stopper (14) is essentially cylindrical and has a flat side (17) extending in the axial direction, while the inside of the mouthpiece (10) is formed with play to be at least partially complementary to the projecting part (16) of the stopper (14), with the mouthpiece (10) having a flat side (13) which is adjacent to the flat side (17) of the stopper (14) when the stopper (14) is inserted in the mouthpiece (10).

5. Assembly according to claim 4, characterised in that the control means are provided near the flat sides (17, 13) of the stopper (14) and the mouthpiece (10).

6. Assembly according to claim 1, characterised in that the connection point between the pipe mouth (6) and the mouthpiece (10) is covered by a slip pipe (22) which rotates freely in the tangential direction about the pipe mouth (6).

* * * * *